United States Patent [19]

Braun

[11] 3,831,007

[45] Aug. 20, 1974

[54] NON-REPRODUCIBLE DOCUMENT

[75] Inventor: Joerg P. Braun, Mount Airy, Md.

[73] Assignee: International Business Machines Corporation, Armonk, N.Y.

[22] Filed: Mar. 21, 1973

[21] Appl. No.: 343,597

[52] U.S. Cl. ........................ 235/61.11 E, 250/219 D

[51] Int. Cl. ......................... G06k 7/10, G01n 21/30

[58] Field of Search ............ 250/219 D; 235/61.6 A, 235/61.7 R, 61.11 E

[56] References Cited

UNITED STATES PATENTS

| | | | |
|---|---|---|---|
| 3,279,826 | 10/1966 | Rudershausen et al. | 283/7 |
| 3,457,391 | 7/1969 | Yamamoto | 235/61.11 E |
| 3,558,899 | 1/1971 | Morgan et al. | 235/61.11 E |
| 3,647,502 | 3/1972 | Newman | 117/36.1 |
| 3,700,858 | 10/1972 | Murthy | 235/61.11 E |

*Primary Examiner*—Stuart N. Hecker
*Attorney, Agent, or Firm*—Henry E. Otto, Jr.

[57] ABSTRACT

Illegal or unauthorized reproduction of copyrighted or classified indicia is precluded by imprinting such indicia on a document having a special preprinted background. This background comprises a plurality of groups of lines, the lines of each group being parallel to each other ahd having a predetermined spacing to form a series of light and dark areas in a repetitive delta-distance code pattern; however, the lines of each group are nonparallel to the lines of adjacent other groups.

If this code pattern is detected during movement of a sensing means translationally relative to the document during photocopying by a convenience office copier, appropriate circuitry responds to shut down the copier. The nonparallel groups of lines assure that shutdown will occur irrespective of the manner in which the document is oriented relative to the sensing means during the aforesaid translational movement.

5 Claims, 6 Drawing Figures

NON-REPRODUCIBLE DOCUMENT

CROSS REFERENCE TO RELATED APPLICATION

U.S. patent application of F. C. Dellacato, Ser. No. 276,337, filed July 31, 1972, entitled "Digital Decoding of Retrospective Pulse Modulation", which issued on Aug. 28, 1973 as U.S. Pat. No. 3,755,654.

BACKGROUND OF THE INVENTION

This invention relates to documents with non-reproducible indicia and to methods for precluding reproduction of such indicia; the invention relates more particularly to documents having preprinted coded backgrounds which when detected by a scanning means in a convenience office copier, initiate a desired control operation.

The rapid increase in the use and availability of convenience office copiers makes it imperative to provide a practical method of preventing the unauthorized reproduction of classified and copyrighted indicia. Several solutions have been proposed to this problem. One is disclosed in U.S. Pat. No. 3,597,082. It involves the use of photochromic paper that, when subjected to radiation in a copier, temporarily changes color to substantially match the color of the indicia which is not to be reproduced, thereby preventing creation of a legible copy. Another solution is to imprint, in a special ink, the indicia which is not to be reproduced, on a sheet having a special masking background; in certain regions of the spectrum, the indicia would be reflective and hence not seen by the copier, whereas in other spectral regions it would be effectively masked by being indistinguishable from the masking background.

While these two approaches are acceptable with certain classes of copiers, they do not preclude copying by so-called white-light copiers, including those that employ zinc oxide-coated paper. Moreover, in each case, the indicia must be printed or written in critically selected colors.

It would be desirable to provide a document, and a method of precluding reproduction of such document, that will be effective irrespective of the color of the critical indicia and will preclude copying by all electrostatic copiers, including white-light copiers.

SUMMARY OF THE INVENTION

According to the invention, these objectives can be achieved by providing each copier with photosensing means that is conditioned to detect and be responsive to a preselected code pattern preprinted as a background on the document. Detection by the photosensing means is concurrent with scanning of the document during photocopying. A desired control operation, such as shutting off the copier and/or sounding an alarm, is initiated when the preselected code pattern is detected. The background pattern is preferably in delta-distance code so as not to be dependent upon the scanning speed. The code pattern is preferably repeated over the entire document, but at different angular orientations, to assure that unauthorized copying will be defeated irrespective of the angle at which the document is oriented relative to the scanning path.

Other objects and advantages will become apparent from the following more detailed description of the invention and from the accompanying drawings.

DESCRIPTION OF PREFERRED EMBODIMENTS

Figure 1:
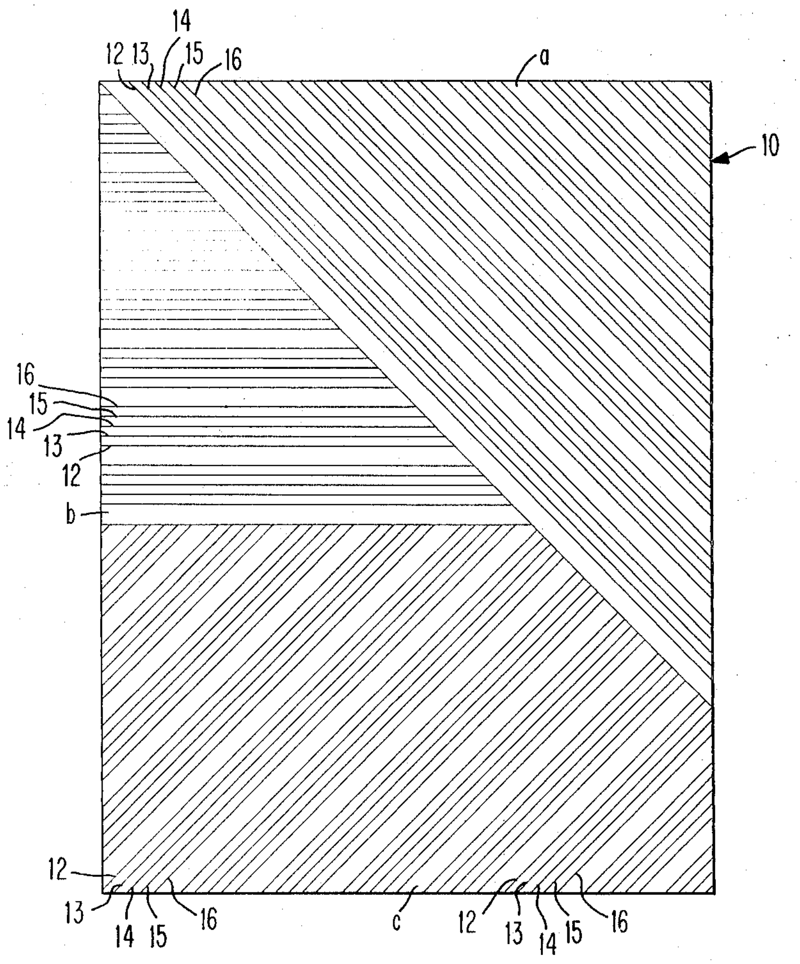
FIG. 1 is a plan view of a document with a background preprinted in a preselected delta-distance code.

As illustrated in FIG. 1, a paper document 10 has a background pattern comprised of three groups *a*, *b*, *c* of lines 12, 13, 14, 15, 16. These lines 12–16 in each group are parallel to each other and have a predetermined spacing (hereinafter described) to form a repetitive coded pattern that provides a series of dark areas (lines 12–16 per se) with intervening light areas (the spaces between said lines). According to an important feature of the invention, and for reasons hereinafter described, the parallel lines 12–16 in each group *a*, *b*, *c* are nonparallel to the lines of adjacent remaining groups.

The code pattern preferably is the self-clocking bar code type described in the aforementioned related copending application and currently referred to as the Delta A code. According to this coding method, bits are encoded by systematic variations in the spacing of successive pairs of bars which, in the document illustrated, are extended to the edges of the document as the lines 12–16. Since decoding is accomplished by comparing adjacent spaces, two at a time, detection is virtually independent of scanning speed.

Figure 2:
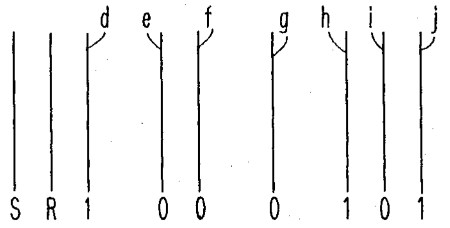
FIG. 2 is a binary representation of a delta-distance code in what is known as Delta A format.

For example, there is shown in FIG. 2 a Delta Distance A code binary representation of the character "1000101" to illustrate the encoding technique or method. According to this technique, where the distance (delta) between two adjacent bars is the same as that between the two immediately preceding bars, the distance between the succeeding pair represents a binary 1; whereas if the distance is different (whether greater or smaller), it represents a binary 0. Thus, since the reference distance is that between starting line S (FIG. 2) and reference line R, the distance between S and R (i.e., S–R), when repeated between R and *d* denotes a binary 1; whereas the distance *d–e* (between *d* and *e*) being unequal to (double) that between R and *d* denotes a binary 0. Following this convention, it will now be apparent that the distance *e–f* denotes a binary 0; distance *f–g*, a binary 0; distance *g–h*, a binary 1; distance *h–i*, a binary 0; and distance *i–j*, a binary 1.

Figure 3:
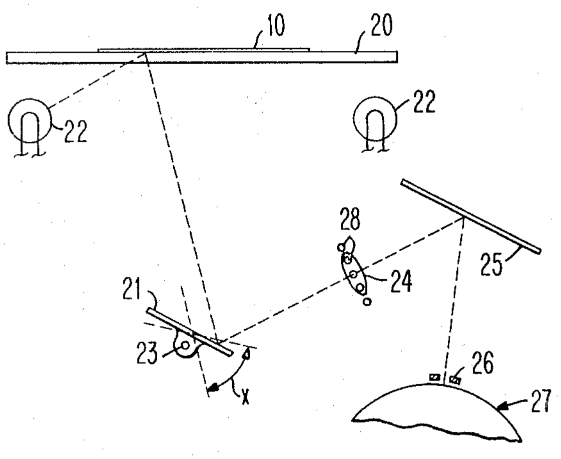
FIG. 3 is a schematic view of one embodiment of convenience office copier adapted to sense the background code on the document, with FIG. 3A showing how the photosensing elements are arranged in a semicircle around the copier lens.

Convenience office copiers of conventional types may readily be adapted to sense and respond to detection of the delta-distance bar code pattern on document 10. For example, FIG. 3 schematically depicts an embodiment of conventional office copier generally of the type shown in U.S. Pat. No. 3,552,211. In this copier, document 10 is supported face down on a transparent stationary bed 20 and scanned translationally by means including an object mirror 21 that oscillates through an angle *x* while the under side of the document is illuminated by a stationary light source 22. As mirror 21 oscillates about an axis 23, it reflects the light and dark areas of the intelligible indicia and background pattern through a fixed lens 24 onto an image mirror 25 that, in turn, reflects the image through a slotted light shield 26 onto a xerographic drum 27. Thus, the document is scanned translationally in a progressive moving line that extends across its entire width, the oscillation of mirror 21 being in timed relation to the movement of the drum.

Figure 3A:
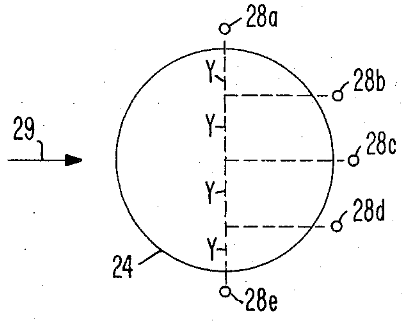

According to the invention, a plurality of photosensors, such as phototransistors 28*a–e*, are arranged in a semicircle around the lens 24 (see FIG. 3A). This semicircle extends arcuately in a direction transverse to the direction indicated by arrow 29, which direction corresponds to that in which the document is scanned translationally by oscillation of mirror 21. The phototransistors are spaced equal distances y apart, as measured diametrically across the lens 24 so that each phototransistor will sense light and dark areas in bands of equal width during scanning of the document.

Figure 4:
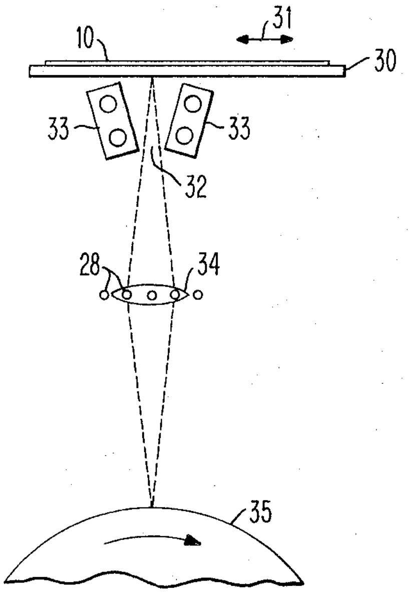
FIG. 4 is a schematic view of another embodiment of convenience office copier which is likewise adapted to sense the background code on the document.

If preferred, the invention may also be applied to a conventional office copier of the type described in U.S. Pat. No. 3,481,589 and depicted in FIG. 4. In this copier, the document 10 to be copied is placed face down on a movable and transparent document support bed 30 that reciprocates back and forth, as indicated by arrow 31. The bed moves rapidly to the right, as shown in FIG. 4, then moves leftward at a controlled slow rate to advance successive transverse portions of the document past a scanning slit 32 while the document is illuminated by light sources 33. As a result, a moving linear image of light and shadow is projected by stationary lens 34 onto photosensitive material carried by a xerographic drum 35.

Again, photosensors, such as phototransistors 28*a–e*, are arranged in a semicircle about lens 34 in the same manner as shown in FIG. 3A.

Figure 5:
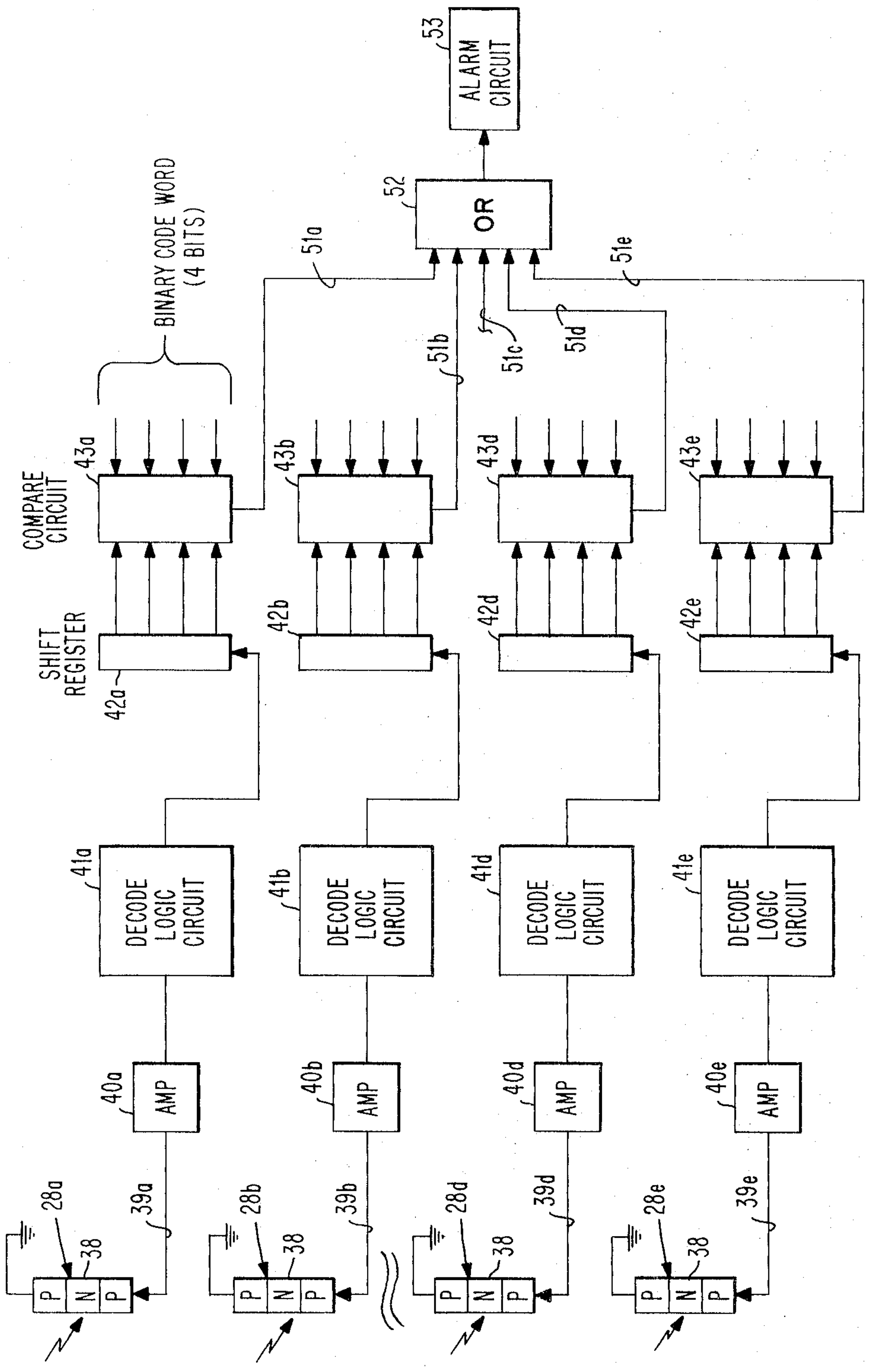
FIG. 5 is a schematic diagram of sensing circuitry that responds to the preselected background code to initiate a desired control operation.

As shown in FIG. 5, each phototransistor 28*a–e* in the apparatus of FIG. 3 or FIG. 4 is driven into conduction by light shining on its base 38. Thus, there is provided in a corresponding line 39*a–e* a series of signals which correspond to the light and dark areas of the background pattern (as well as other indicia) on document 10. Each signal is amplified by a respective amplifier 40*a–e* and transmitted to a corresponding decode logic circuit 41*a–e*. Each circuit 41*a–e* is preferably of the type shown and described in the above-identified related application; it converts the series of signals corresponding to light and dark areas into a corresponding sequence of binary zeros and ones which is continuously shifted into and through a respective four-bit shift register 42*a–e*. Compare circuitry 43*a–e* associated with each transistor 28*a–e* compares the parallel outputs from each shift register with a static four-bit predetermined binary code word (illustratively depicted as "1111" on the document shown in FIG. 1). When the predetermined binary code word in delta-distance bar code is detected by any one of the phototransistors 28*a–e*, a signal will be provided in line 51*a–e*, respectively, and passed via OR gate 52 to initiate a desired control operation. In the embodiment illustrated, this signal will activate an alarm circuit 53 that, when energized, not only sounds an alarm but also shuts off power to the copier to prevent delivery of the unauthorized copy; and, if desired, the signal may also prevent raising of the cover and removal of the original document 10.

The bar code pattern should be sufficiently long and complex to prevent inadvertent triggering of the alarm circuit by harmless intelligible indicia on a document for which no copying restriction is intended and which has no background bar code pattern. Thus, while a four-bit "1111" code is shown for purposes of simplified illustration, in practice it is preferable that the code be at least six bits long and include zeros as well as ones; e.g., "101010."

It should be noted, that the photosensing means 28 and the detection circuitry responsive thereto, as illustrated in FIGS. 3 and 4, do not compare the distance between adjacent bars or lines 12–16 as such, but actually compare the scanning times between successive pairs of lines. Thus, in the illustrated code pattern, wherein successive lines are spaced either one unit or two units of distance apart, there is sufficient flexibility so that a slight variation in scanning speed of successive portions of the same document will not prevent detection of the predetermined background pattern. Also, the background pattern merely requires a ratio in the widths of the spaces; i.e., the distance between successive bars is not a predetermined precise specific dimension (such as 0.025 inch). And finally, a document, having a background pattern with the predetermined ratio of a single or double space between successive lines, can be used in a variety of copiers, even though they have different translational scanning speeds.

It should be noted that the background pattern preferably is imprinted in a color that is a shade of black (e.g., gray) which is dark enough to be sensed but sufficiently light so as not to be aesthetically unacceptable. By thus imprinting in a shade of black, the background pattern will be detachable in copiers operating in different spectral regions, including the so-called white light copiers. (This will prevent a situation in which a background pattern printed in a blue ink, for example, would not be detected in a copier having a light source that operates primarily in the blue region of the spectrum.)

It should also be noted that the phototransistors 28*a–e* are preferably arranged in a semicircle around lens 24 (or 34), as previously explained, so that they will sense respective equal width bands across the entire width of the document 10 as it is scanned translationally by oscillation of mirror 21 (or reciprocation of bed 30).

The delta-distance bar code pattern is comprised of a plurality of groups *a, b, c* of parallel lines 12–16, with the lines of each group being nonparallel to the lines of adjacent groups. This is to assure that the lines and spaces constituting the predetermined code word can be sensed by the phototransistors 28*a–e* irrespective of the angular orientation of the document 10 on the bed 20 or 30. (Note that if only a single group, like *a*, of lines 12–16 are provided on the document, and the document is oriented so that these lines 12–16 are parallel or substantially parallel to the direction in which the document is scanned translationally [i.e., the direction of arrow 29 in FIG. 3A], the lines will not "cut across" the phototransistors and create light and dark areas; hence circuits 41 will fail to convert these areas into a binary code indicative of the predetermined code word, even though the document is one having the code pattern background thereon.)

While the invention has been particularly shown and described with reference to preferred embodiments thereof, it will be understood by those skilled in the art that the foregoing and other changes in form and details may be made therein without departing from the spirit and scope of the invention.

What is claimed is:

1. As an article of manufacture, a document having a preprinted background comprised of a plurality of groups of lines, the lines of each group being parallel to each other and having a predetermined spacing and consisting of lines of equal width separated by spaces of a plurality of different widths to form a series of light and dark areas in a repetitive pattern, but the lines of each group being nonparallel to the lines of adjacent other groups, said pattern of lines and spaces remaining constant during movement of a sensing means translationally at a preselected constant speed relative to the document during a photocopying operation so as to initiate a preselected control operation when detected during such photocopying operation, the nonparallel groups of lines assuring that the control operation will be initiated irrespective of the manner in which the document is aligned and oriented during such translational relative movement.

2. A document according to claim 1, wherein the background is preprinted in an ink having spectral characteristics matched to that of the sensing means to encompass the total spectrum within which the photocopying machine performs its photocopying operation.

3. A document according to claim 1, wherein the lines of the repetitive pattern conform to a preselected value in delta distance code, which value is the only value to which the sensing means is responsive to initiate the control operation.

4. For use with a convenience office copier comprising photosensing means that moves translationally at a constant speed relative to a document-supporting bed during a copying operation, and means controlled by said photosensing means responsive to a predetermined spacing of light and dark areas to initiate a preselected control operation:

a document having a preprinted background comprised of a plurality of groups of lines, the lines of each group being parallel to each other and consisting of lines of equal width separated by spaces of a plurality of difference widths to form a repetitive pattern of light and dark areas with said predetermined spacing, which pattern remains constant irrespective of the magnitude of the constant speed, the lines of each group being nonparallel to the lines of adjacent other groups, the nonparallel groups of lines assuring that the control operation will be initiated irrespective of the manner in which the document is aligned and oriented on the document-supporting bed.

5. A document according to claim 4, wherein the repetitive pattern of light and dark areas conforms to a preselected value in delta distance code, which value is the only value to which the means controlled by the photosensing means is responsive.

* * * * *